UNITED STATES PATENT OFFICE.

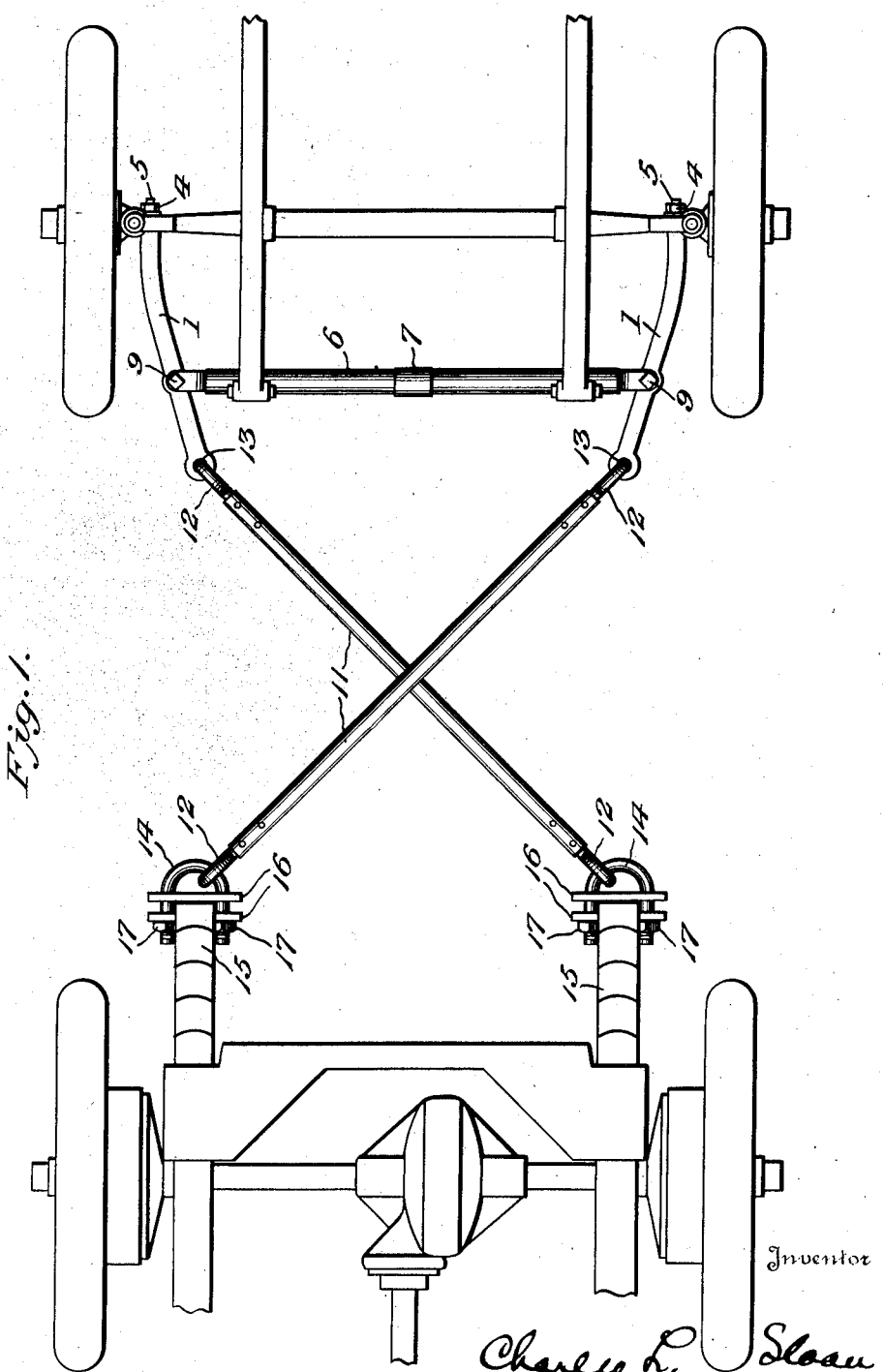

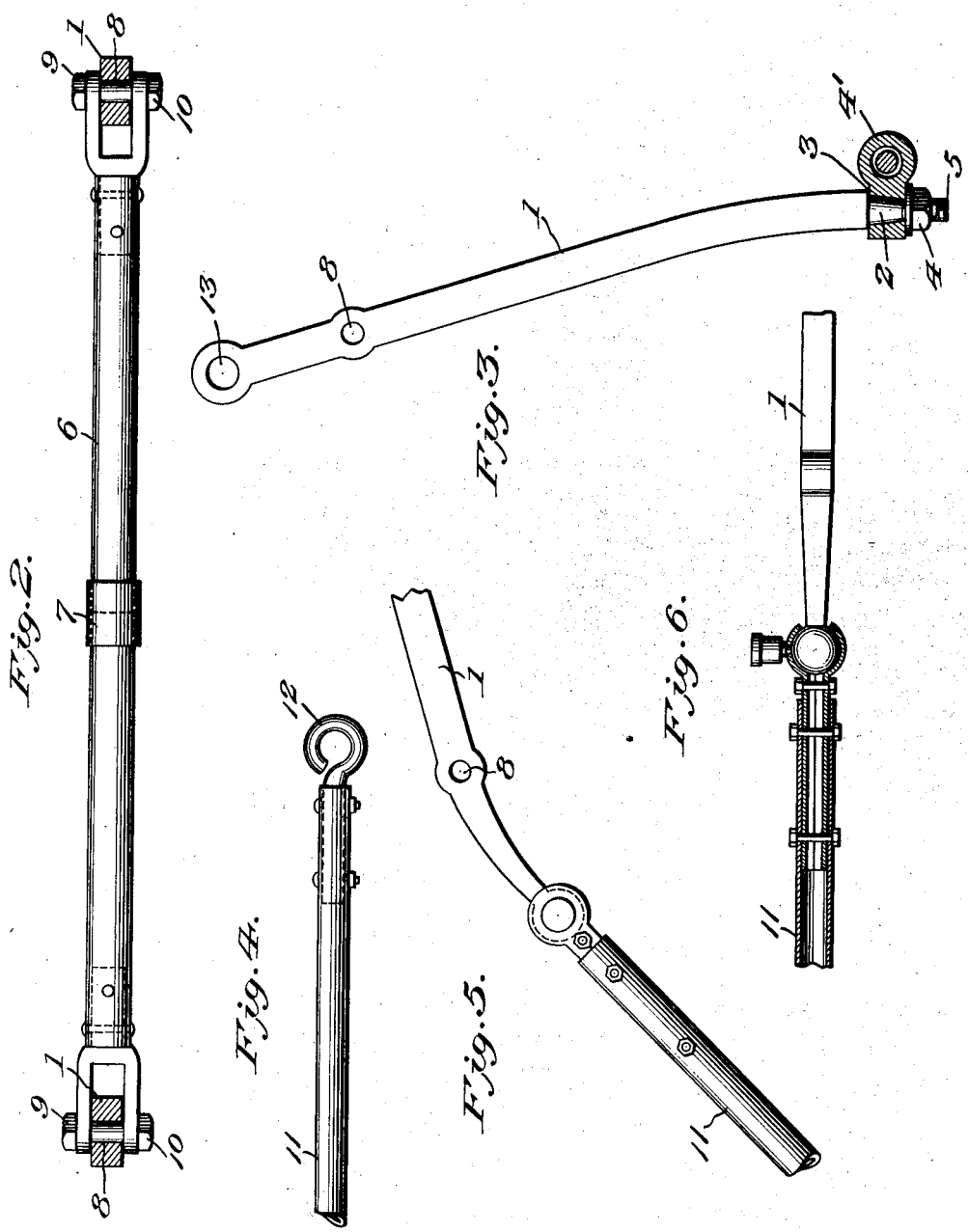

CHARLES L. SLOAN, OF MEMPHIS, TEXAS.

AUTOMATIC TRAILING DEVICE.

1,331,854. Specification of Letters Patent. Patented Feb. 24, 1920.

Application filed April 10, 1918. Serial No. 227,752.

*To all whom it may concern:*

Be it known that I, CHARLES LEE SLOAN, a citizen of the United States, residing at Memphis, in the county of Hall and State of Texas, have invented certain new and useful Improvements in Automatic Trailing Devices, of which the following is a specification.

My invention relates to an improvement in automatic trailing devices, and the object is to provide means by which an automobile or like vehicle can be coupled or hitched to the rear of another machine and be trailed or towed and made to successfully follow the tracks of the front vehicle without the use of a driver on the vehicle in tow, this trailing device or coupling being especially adapted to, and very useful in, trailing or towing vehicles that are steered or guided by the use of steering-knuckles at the ends of front axles, such as nowadays commonly used on the front axles of automobiles, trucks, and other like vehicles.

In the accompanying drawings:—

Figure 1 is a plan view showing two machines attached together;

Fig. 2 to 5 are details,

Fig. 6 is a modification.

Numeral 1 represents a guide-bar of which there are two. These are provided with a taper 2 at one end adapted to fit the taper hole 3 in the steering-knuckle 4'. In some machines, it will be necessary to turn the front axle or steering knuckle around, in order to bring this taper hole or socket in front, but this is only necessary where cars are to be taken a long distance, such, for instance, as in driving a number of new cars from the factory to the jobber, where two or more automobiles are to be fastened together, which is one of the fundamental purposes of my present invention.

When the taper 2 is thus inserted in the taper hole or socket, a nut 4 is screwed on the threaded end 5 of the guide-bar in order to hold it rigidly in place.

There are two of these guide-bars, one being secured to each steering-knuckle, and a tie-yoke 6 preferably made of tubing and in two parts adapted to be screwed together at the center, as at 7, has the forked ends which embrace the guide-bars over the punch-holes 8. A bolt 9 is inserted through and held in place by a nut 10.

The object in making the tie-yoke in two parts is that it can be easily packed in small compass when not in use by unscrewing it and taking it apart at the center.

Numeral 11 represents the draw-bar. This is preferably made of one-inch (1") pipe, and may have the bendable eyes 12 bolted at the ends, or in lieu thereof the ends could be in the form of sockets, and the forward ends of the guide-bars in the form of balls, as shown in Fig. 6, whereby to form a ball-and-socket-coupling between the guide-bar and draw-bar.

In the preferred form, there is simply a punch-hole 13 in the end of the guide-bar adapted to receive the eye formation on the end of the draw-bar when the latter is made in that form. Whether in this form or in the form of a ball or socket joint, the idea is to give freedom of movement in some form of universal joint.

The draw-bars cross over at the center and are coupled by means of U-bolts or similar devices 14 to the rear ends of the semi-elliptic springs 15 of the front vehicle, where they are held by clamp-plates 16 and nuts 17.

By means of this construction, as the forward vehicle is turned the steering-knuckles of the front axle of the rear vehicle or the one towed are correspondingly turned, and consequently the wheels of the vehicle in tow approximately follow the track made by the wheels of the forward vehicle, and all movements are transmitted from one car to the other with flexibility and precision, and at the same time a sufficient degree or rigidity is maintained to prevent whipping or slewing of the machine in tow, thus making it possible to travel at a fair rate of speed around curves as well as on a straight course, and hence possible to carry at least two, if not three or more, vehicles to a driver, which has not hitherto been successfully done.

I claim:

The combination with the steering knuckles of an automobile, each of which has a tapering hole therein, guide-bars having tapering ends removably fitted to the tapering holes, and means for securing said tapering ends in the holes, of a tie-yoke extending across from one guide-bar to the other and pivotally connected therewith at a point more or less midway between the ends of the guide-bars, and draw-bars connected with the free ends of the guide-bars and adapted to be crossed and attached to the forward or hauling vehicle.

In testimony whereof I affix my signature.

CHARLES L. SLOAN.